Figure 1:
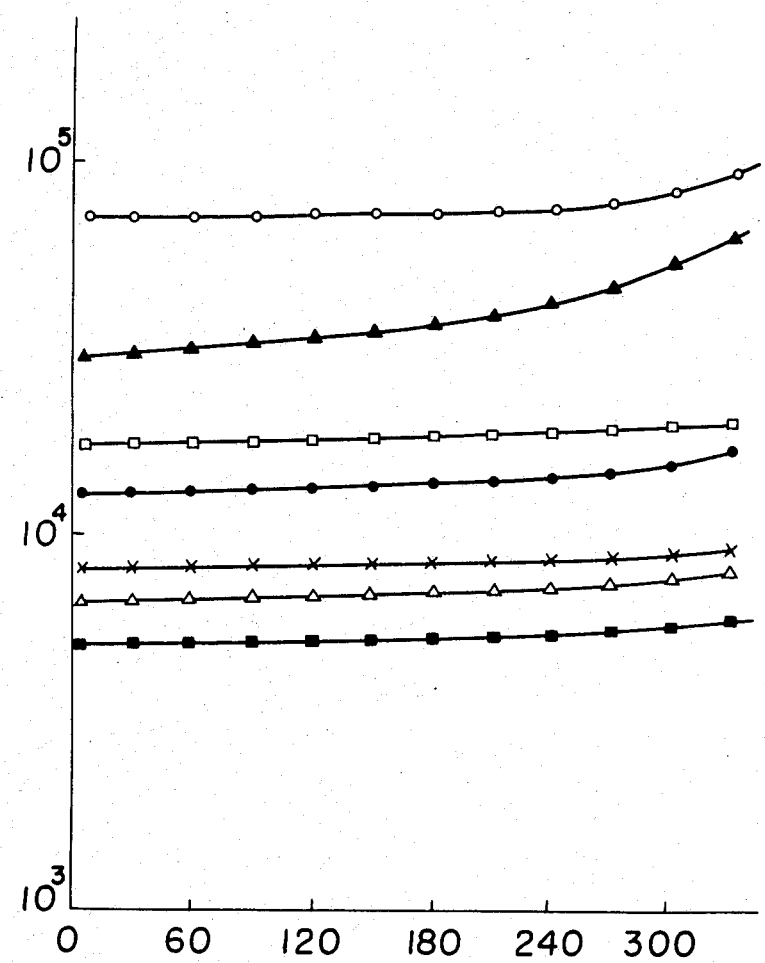

United States Patent [19]

Ando et al.

[11] Patent Number: 4,638,021

[45] Date of Patent: Jan. 20, 1987

[54] EPOXY RESIN COMPOSITION

[75] Inventors: Toshiharu Ando, Itami; Masaru Tsuchihashi, Sanda, both of Japan

[73] Assignee: Mitsubishi Denki Kabushiki Kaisha, Tokyo, Japan

[21] Appl. No.: 701,304

[22] Filed: Feb. 13, 1985

[51] Int. Cl.$^4$ .............................................. C08L 63/00
[52] U.S. Cl. ................................... 523/457; 523/466; 528/92; 528/104
[58] Field of Search ................ 523/457, 466; 525/504, 525/506, 507; 528/91, 92, 93, 104, 112

[56] References Cited

U.S. PATENT DOCUMENTS

| | | | |
|---|---|---|---|
| 2,890,195 | 6/1959 | Phillips et al. | 528/112 X |
| 2,890,197 | 6/1959 | Phillips et al. | 528/112 |
| 2,908,664 | 10/1959 | Belanger et al. | 528/104 X |
| 2,928,809 | 3/1960 | Hicks | 528/104 |
| 2,934,521 | 4/1960 | Masters et al. | 528/104 |
| 3,000,848 | 9/1961 | McGary et al. | 528/297 |
| 3,429,981 | 2/1969 | Shallahamer et al. | 523/457 X |
| 3,563,939 | 2/1971 | Stevens et al. | 523/457 |
| 3,689,444 | 9/1972 | Wolfe | 528/112 X |

FOREIGN PATENT DOCUMENTS

| | | |
|---|---|---|
| 2134018 | 12/1972 | France . |
| 2359164 | 2/1978 | France . |
| 57-174314 | 10/1982 | Japan . |
| 821972 | 10/1959 | United Kingdom . |

*Primary Examiner*—Earl Nielsen
*Attorney, Agent, or Firm*—Oblon, Fisher, Spivak, McClelland, & Maier

[57] ABSTRACT

An epoxy resin composition which comprises a mixture (a) obtained by mixing 100 parts by weight of a polybasic carboxylic acid anhydride with from 10 to 70 parts by weight of a compound having at least two phenol groups, an epoxy resin having at least two epoxy groups in the molecule, a catalyst, and an inorganic powder as a filler.

6 Claims, 1 Drawing Figure

EPOXY RESIN COMPOSITION

The present invention relates to an epoxy resin composition.

In order to obtain good electrical, mechanical and thermal properties for cast insulators, it has been common to employ for the production of cast insulators an epoxy resin composition composed of a bisphenol A-type epoxy resin alone or a combination of such an epoxy resin with one or more cycloaliphatic epoxy resins, or an epoxy resin composition comprising a polybasic carboxylic acid anhydride and various fillers. As mentioned above, for the purpose of improving the electrical, mechanical or physical properties of the epoxy resins, various fillers may be employed depending upon the particular uses. Among them, alumina powder is widely used as a filler which is superior in the heat conductivity, the filling property and the chemical resistance and which exhibits particularly excellent durability in the field of electric appliances in which sulfur hexafluoride is used as an arc extinguishing medium or insulating medium.

It is quite common to embed metal electrodes such as copper or aluminum electrodes in cast insulators made of epoxy resins, which are useful for power appliances or transmission and distribution equipments. When such cast insulators are to be prepared from the above-mentioned epoxy resin composition, it is usual to employ a process which comprises implanting electrodes in a casting mold in advance, then pouring a casting resin composition prepared under a predetermined mixing condition, into the casting mold, curing the composition under the predetermined curing condition, and then removing the cured product from the mold.

However, in such a process, the filler is likely to sediment because of the substantial difference in the specific gravities of the resin components and the inorganic powder used as the filler. Therefore, the casting resin composition is required to have a proper viscosity for the production, and it is usual, in many cases, to employ a bisphenol A-type epoxy resin having a molecular weight of at least about 700. The resin composition containing such an epoxy resin is required to be heated at a high temperature in order to bring its viscosity to a suitable level. If it is heated to a high temperature to obtain a suitable viscosity, the useful working time tends to be extremely short. Further, if the amount of the incorporated resin composition becomes large, heat accumulation in the mixture increases, heat generation likewise increases, and the reaction will be accelerated, whereby the useful working time will be further shortened. Accordingly, for the mass production of products having the same shape, a great number of casting molds will be required.

Furthermore, epoxy resins have a characteristic that they undergo shrinkage during the curing reaction. Accordingly, if an article having a large size, which requires a large amount of resin, is to be prepared by the above-mentioned process, it is likely that defects such as so-called shrinkage cavities, voids or cracks, form at the surface or interior of the article or at the interface between the embedded electrodes and the cured resin composition, due to the curing shrinkage of the epoxy resin composition.

As one of the processes to overcome these problems, there is a process which is generally called a pressure gelation process. According to this process, a resin composition is poured into a casting mold in which electrodes to be embedded are disposed at the predetermined positions, and the mold temperature for the curing is set at a level higher than the mixing temperature of the resin composition, whereby the resin composition is permitted to be cured firstly at the portion contacting the casting mold, then towards the center and further towards the inlet, and the volume reduction of the resin composition due to the curing shrinkage is supplemented by pouring an uncured resin composition under pressure from the inlet. The epoxy resin composition is required to have a characteristic that it rapidly reacts at a high temperature. Further, in order to improve the productivity, it is also important to reduce the number of washing operations for cleaning the mixing tank or the resin supply conduits. For this purpose, it may be necessary that a great amount of the resin composition is preliminarily mixed so that it can be used for a long period of time.

When a conventional epoxy resin composition is used in this process, it is possible to rapidly cure the composition at a high temperture. However, when it is mixed, at a low temperature, the mixture of the epoxy resin and the filler tends to be highly viscous, and the mixing tank will be abraded, whereby the metal components of the mixing tank will be incorporated in the resin composition, thus leading to a deterioration of the electric characteristics as an insulator.

On the other hand, as an epoxy resin which has a low viscosity at a low temperature and is capable of rapidly reacting at a high temperature, there may be mentioned a cycloaliphatic epoxide-type epoxy resin. However, when it is rapidly cured at a high temperature, the resulting product is likely to have cracks.

Under these circumstances, the present invention has been accomplished, and it provides an epoxy resin composition which comprises a mixture (a) obtained by mixing 100 parts by weight of a polybasic carboxylic acid anhydride with from 10 to 70 parts by weight of a compound having at least two phenol groups, an epoxy resin having at least two epoxy groups in the molecule, a catalyst, and an inorganic powder as a filler.

Now, the present invention will be described in detail with reference to the preferred embodiments.

In the accompanying drawing, FIG. 1 is a graph showing the changes with time of the viscosities of the epoxy resin compositions prepared in Examples 1 to 3 and Comparative Examples 1 to 4.

As the polybasic carboxylic acid anhydride which may be used for the present invention, those which are commonly used as curing agents for epoxy resins may be used without any particular restriction. For instance, there may be mentioned methyltetrahydrophthalic anhydride, methyl nadic anhydride, methylhexahydrophthalic anhydride, hexahydrophthalic anhydride, phthalic anhydride, and trimellitic anhydride. Among them, those which are liquid at room temperature or which have a melting point of not higher than 150° C., are preferred in view of the handling efficiency such as efficiency in the weight measurement at low a temperature of the mixture obtained by heating and melting together with a compound having at least two phenol groups such as bisphenol A.

As the compound having at least two phenol groups, which will be heated and melted together with the above-mentioned polybasic carboxylic acid anhydride, there may be mentioned, for instance, bisphenol A, bisphenol S or bisphenol F. However, such a compound is not restricted to these specific examples.

In the case where e.g. bisphenol A is used as the compound having at least two phenol groups, the resulting cured product will have superior crack resistance as compared with the cured product wherein the usual acid anhydride-type curing agent is used alone.

In the present invention, the mixture (a) is obtained by mixing 100 parts by weight of the polybasic carboxylic acid anhydride with from 10 to 70 parts by weight of the compound having at least two phenol groups. If the amount of the compound having at least two phenol groups is less than 10 parts by weight, the relative amount of the polybasic carboxylic acid anhydride increases, and consequently, when the epoxy resin composition prepared by using the mixture (a) is cured at a high temperature, the viscosity tends to be extremely low, whereby sedimentation of the filler is likely to take place, or no substantial improvement will be obtained in the crack resistance of the cured product. On the other hand, if the amount of the compound having at least two phenol groups exceeds 70 parts by weight, the viscosity of the mixture (a) itself at a low temperature tends to be high, whereby the operation efficiency for weight measurement will be substantially lowered, and when used for the preparation of an epoxy resin composition, the viscosity of the resulting composition will be extremely high, whereby it will be difficult to prepare a cast insulator.

As the epoxy resin having at least two epoxy groups in the molecule, most of the commercial products may be used for the purpose of the present invention. For instance, there may be mentioned bisphenol-type epoxy resins, cycloaliphatic epoxy resins, novolak-type epoxy resins and glycidyl ester-type epoxy resins. However, the useful epoxy resins are not restricted to these specific examples.

As the catalyst which may be used for the present invention, there may be mentioned metal salts of organic carboxylic acids, tertiary amines, boron trifluoride-amine complexes, bicycloamidine or its salts. More specifically, there may be mentioned zinc octylate, benzyl dimethylamine, boron trifluoride-monoethylamine complex, DBU (1,8-diazabicyclo (5,4,0)undecene-7). However, the useful catalyst is not restricted to these specific examples.

When the epoxy resin composition is cured by using a metal salt of an organic carboxylic acid, particularly zinc octylate, as the above catalyst, it is possible to form a great amount of ether bonds and thereby to improve the flexibility and chemical resistance of the cured product.

As the inorganic powder used as a filler in the present invention, there may be mentioned, for instance, alumina powder or quartz powder. However, the useful inorganic powder is not restricted to these specific examples.

Alumina powder has good heat conductivity. Accordingly, when alumina powder is used as the inorganic powder, the exothermic temperature during the curing of the epoxy resin composition will be lowered, whereby the thermal strain resulting during the curing operation can be reduced and it is possible to obtain a cured product having excellent crack resistance.

The epoxy resin composition of the present invention usually comprises 100 parts by weight of the epoxy resin having at least two epoxy groups in the molecule, from 30 to 150 parts by weight of the mixture (a), from 0.05 to 5 parts by weight of the catalyst, and the inorganic powder in an amount of from 30 to 60% by volume based on the total volume of the composition. The epoxy resin composition may further contain a flexibility-imparting agent, a coloring agent, a modifier, an aging-preventive agent, an internal releasing agent or a diluent, as the case requires.

Now, the composition of the present invention will be described in further detail with reference to Examples and Comparative Examples. However, it should be understood that the present invention is by no means restricted by these specific Examples.

EXAMPLE 1

100 parts by weight of GY-260 (manufactured by Ciba Geigy AG), 88 parts by weight of a mixture obtained by mixing methyl-THPA (curing agent) with 10% by weight of bisphenol A, 1 part by weight of zinc octylate and 540 parts by weight of alumina powder, were stirred at 60° C. under reduced pressure to obtain an epoxy resin composition.

The initial viscosity, the useful working time, the time for gelation and the viscosity change with time of the composition thus obtained were measured in accordance with the following methods. The results are shown in Table 1 and FIG. 1.

By using the composition, the crack resistance test piece was prepared in the following manner, and the crack index of the cured product was measured. The results are shown in Table 1.

Initial viscosity

After the preparation of the epoxy resin composition, the composition was stirred under reduced pressure at 60° C. for 15 minutes, and then the viscosity was measured.

Useful working time

After the preparation of the epoxy resin composition, the viscosity was measured at 60° C. with an interval of 30 minutes, and the time until the viscosity became $2 \times 10^4$ cp, was measured.

Time for gelation

The epoxy resin composition was heated in a hot air dryer at 150° C. and the time until the composition gelated, was measured.

The viscosity change with time

The epoxy resin composition was put in a container at 60° C., and set in an oil bath at 60° C. The viscosity was measured with an interval of 30 minutes, and the change with time was observed.

Crack index

By using the epoxy resin composition, a crack resistance test piece was prepared in accordance with IEC recommended method (publication 455-2) (the composition was geled at 150° C., and then cured at 130° C. for 24 hours), and then evaluated.

EXAMPLE 2

100 parts by weight of GY-260, 80 parts by weight of a mixture prepared by mixing methyl-THPA with 30% by weight of bisphenol A, 1 part by weight of zinc octylate and 510 parts by weight of alumina powder, were stirred at 60° C. under reduced pressure to obtain an epoxy resin composition.

The properties of the composition thus obtained and the crack index of the cured product were measured in the same manner as in Example 1. The results are shown in Table 1 and FIG. 1.

Further, by using the composition thus obtained, the dielectric constant, tan δ, the specific volume resistance, the bending strength, the tensile strength and the thermal deformation temperature, were measured in accordance with the following methods. The results are shown in Table 1.

Dielectric constant, tan δ, specific volume resistance and bending strength

Test pieces were prepared in accordance with JIS K-6911, and evaluated at room temperature (about 20° C.).

Tensile strength

A test piece was prepared in accordance with JIS K-7113, and evaluated at room temperature (about 20° C.).

Deflection temperature under flexural load

A test piece was prepared in accordance with ASTM D648, and evaluated.

EXAMPLE 3

100 parts by weight of GY-260, 75 parts by weight of a mixture obtained by mixing methyl-THPA with 65% by weight of bisphenol A, 1 part by weight of zinc octylate and 500 parts by weight of alumina powder, were stirred at 60° C. under reduced pressure to obtain an epoxy resin composition.

The properties of the composition thus obtained and the properties of the cured product were measured in the same manner as in Example 2. The results are shown in Table 1 and FIG. 1.

COMPARATIVE EXAMPLE 1

100 parts by weight of CT-200 (bisphenol A-type epoxy resin, manufactured by Ciba-Geigy AG), 45 parts by weight of methyl-THPA and 410 parts by weight of alumina powder, were stirred at 60° C. under reduced pressure to obtain an epoxy resin composition.

The properties of the composition thus obtained and the properties of the cured product were measured in the same manner as in Example 2. The results thereby obtained are shown in Table 1 and FIG. 1.

COMPARATIVE EXAMPLE 2

100 parts by weight of GY-260, 90 parts by weight of methyl-THPA, 1 part by weight of zinc octylate and 540 parts by weight of alumina powder, were stirred at 60° C. under reduced pressure to obtain an epoxy resin composition.

The properties of the composition thus obtained and the properties of the cured product, were measured in the same manner as in Example 2. The results are shown in Table 1 and FIG. 1.

COMPARATIVE EXAMPLE 3

100 parts by weight of GY-260, 86 parts by weight of a mixture obtained by mixing methyl-THPA with 7.5% by weight of bisphenol A, 1 part by weight of zinc octylate and 530 parts by weight of alumina powder, were stirred at 60° C. under reduced pressure to obtain an epoxy resin composition.

The properties of the composition thus obtained and the crack index of the cured product, were measured in the same manner as in Example 1. The results are shown in Table 1 and FIG. 1.

COMPARATIVE EXAMPLE 4

100 parts by weight of GY-260, 72 parts by weight of a mixture obtained by mixing methyl-THPA with 80% by weight of bisphenol A, 1 part by weight of zinc octylate and 490 parts by weight of alumina powder, were stirred at 60° C. under reduced pressure to obtain an epoxy resin composition.

The properties of the composition thus obtained and the crack index of the cured product, were measured in the same manner as in Example 1. The results are shown in Table 1 and FIG. 1.

In the foregoing Examples and Comparative Examples, the filler concentration to the epoxy resin composition was about 74%, and the amount of the curing agent relative to the epoxy resin was adjusted to be an equivalent ratio of 1.

TABLE 1

| | Properties of the composition | | | | Properties of the cured product | | | | | |
|---|---|---|---|---|---|---|---|---|---|---|
| | Initial viscosity (cp) | Useful working time (min) | Time for gelation (min) | Crack index | Dielectric constant (60 Hz) | tan δ (60 Hz, %) | Specific volume resistance ($\Omega \cdot$ cm) | Bending strength (kgf/mm$^2$) | Tensile strength (kgf/mm$^2$) | Deflection temperature under flexural load (°C.) |
| Example | | | | | | | | | | |
| 1 | 8200 | at least 300 | 21 | 5.2 | — | — | — | — | — | — |
| 2 | 12800 | at least 300 | 18 | 6.5 | 6.1 | 0.42 | $0.2 \times 10^{16}$ | 15.3 | 9.1 | 112 |
| 3 | 18000 | 270 | 19 | 7.4 | 6.0 | 0.40 | $2.2 \times 10^{16}$ | 15.6 | 9.5 | 111 |
| Comparative Example | | | | | | | | | | |
| 1 | 70000 | — | 42 | 4.2 | 6.6 | 0.56 | $1.0 \times 10^{16}$ | 13.5 | 8.7 | 109 |
| 2 | 5000 | at least 300 | 37 | 1.0 | 6.3 | 0.52 | $1.0 \times 10^{16}$ | 13.2 | 8.5 | 107 |
| 3 | 6800 | at least 300 | 20 | 1.5 | — | — | — | — | — | — |
| 4 | 31000 | — | 22 | 5.1 | — | — | — | — | — | — |

The epoxy resin compositions of the present invention provide excellent operation efficiency such as a long useful working time at a low temperature and excellent reactivity at a high temperature, and have a suitable viscosity for dispersing fillers. Accordingly, the cured products thereby obtained have excellent properties such as crack resistance, tan δ, bending strength and tensile strength, and exhibit good characteristics with respect to other properties which are commonly required.

We claim:
1. An epoxy resin composition which comprises a mixture a) obtained by mixing:
   (i) 100 parts by weight of a polybasic carboxylic acid anhydride, with
   (ii) from 10–70 parts by weight of a compound having at least 2 phenol groups in the molecule,
   (iii) an epoxy resin having at least 2 epoxy groups in the molecule,
   (iv) powered alumina, and
   (v) from 0.05–5 parts by weight of zinc octylate.

2. The composition according to claim 1, wherein the compound having at least two phenol groups is bisphenol A.

3. The composition according to claim 1, which comprises from 30–150 parts by weight of said mixture (a), 100 parts by weight of said epoxy resin, and said alumina powder in an amount of from 30–60% by volume based on the total volume of the composition.

4. The composition according to claim 1, wherein said epoxy resin composition is a liquid.

5. The composition according to claim 1, wherein said polybasic carboxylic acid anhydride of mixture (a) is a curing agent for an epoxy resin composition.

6. The composition according to claim 1, wherein said polybasic carboxylic acid anhydride has a melting point of not greater than 150° C.

* * * * *